July 27, 1954 — E. M. BARDEN — 2,684,847
VEHICLE WINDOW REGULATOR
Filed May 4, 1951 — 5 Sheets-Sheet 1

INVENTOR.
Earl M. Barden.
BY
Harness, Dickey & Pierce
ATTORNEYS

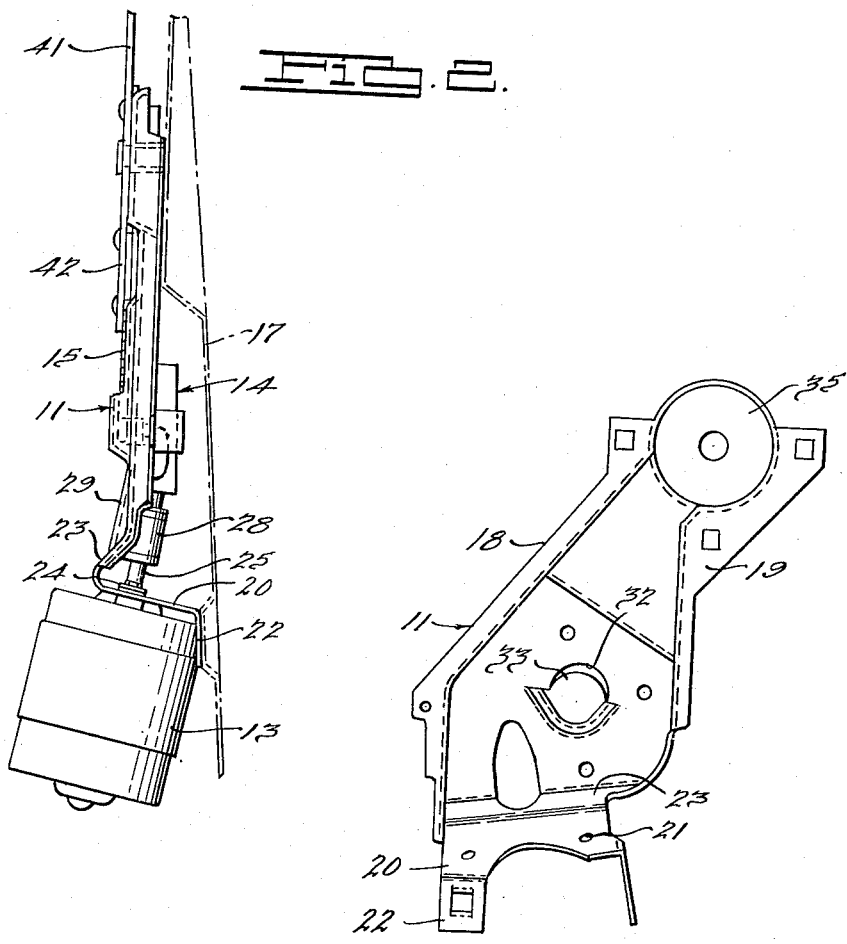

July 27, 1954

E. M. BARDEN 2,684,847

VEHICLE WINDOW REGULATOR

Filed May 4, 1951

INVENTOR.
Earl M. Barden.
BY
Harness, Dickey & Pierce
ATTORNEYS.

July 27, 1954
E. M. BARDEN
2,684,847
VEHICLE WINDOW REGULATOR
Filed May 4, 1951
5 Sheets-Sheet 4
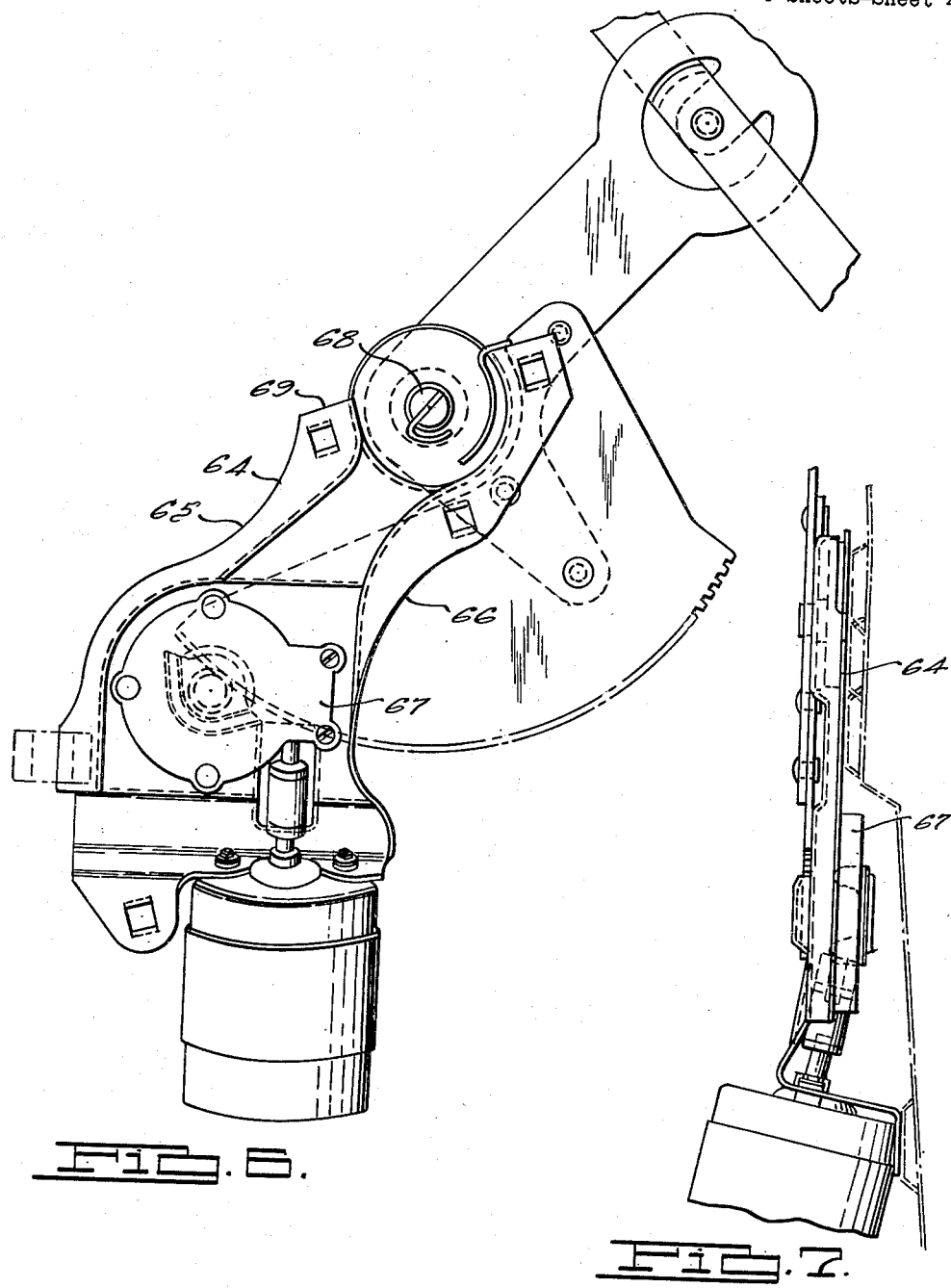
INVENTOR.
Earl M. Barden.
BY
Harness, Dickey & Pierce
ATTORNEYS.

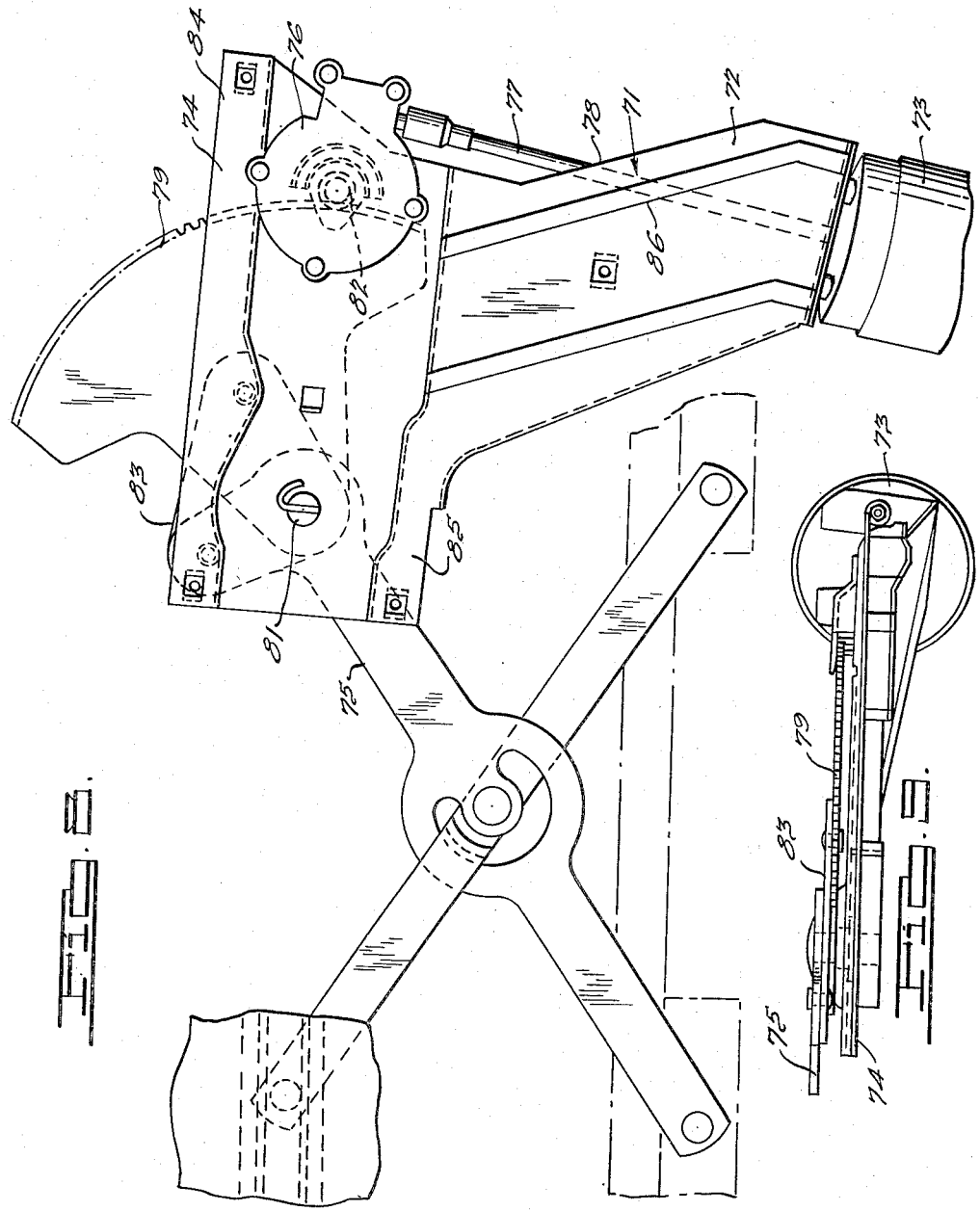

Patented July 27, 1954

2,684,847

UNITED STATES PATENT OFFICE 2,684,847

VEHICLE WINDOW REGULATOR

Earl M. Barden, Grosse Pointe Farms, Mich., assignor to Hupp Corporation, Cleveland, Ohio, a corporation of Virginia Application May 4, 1951, Serial No. 224,579

7 Claims. (Cl. 268—124)

This invention relates to window regulators, and more particularly to mechanisms adapted to raise and lower windows of automotive vehicles or the like by power actuating means installed within the door body.

This application is a continuation-in-part of applicant's copending application No. 198,443 filed November 30, 1950, now abandoned, and it is an object of the present invention to provide a window regulator mechanism of the type described which comprises a package unit containing all the elements of the mechanism, which may be preassembled and tested before installation in the door, and which is adaptable for various space conditions within the door body as well as for various window movements. More particularly, it is an object to provide a window regulator mechanism as described, which is extremely compact in design and which is particularly adapted for use with a scissors or cross-arm type of window actuating linkage, the latter being embodied in a preassembled package unit together with the other elements of the power driven regulator.

Other objects, features, and advantages of the present invention will become apparent from the subsequent description taken in conjunction with the accompanying drawings.

In the drawings:

Figure 2 is a side elevational view of the package unit of Fig. 1, parts being broken away;

Figure 3 is an elevational view of the mounting plate used in the embodiment of Figs. 1 and 2;

Figure 6 is a second modification of the package unit with a different arrangement of elements;

Figure 7 is a side elevational view of the embodiment of Fig. 6;

Figure 8 is a third modification of the package unit especially adapted for windows of large lateral dimensions; and Figure 9 is a side elevational view of the embodiment of Fig. 8.

Figure 1:
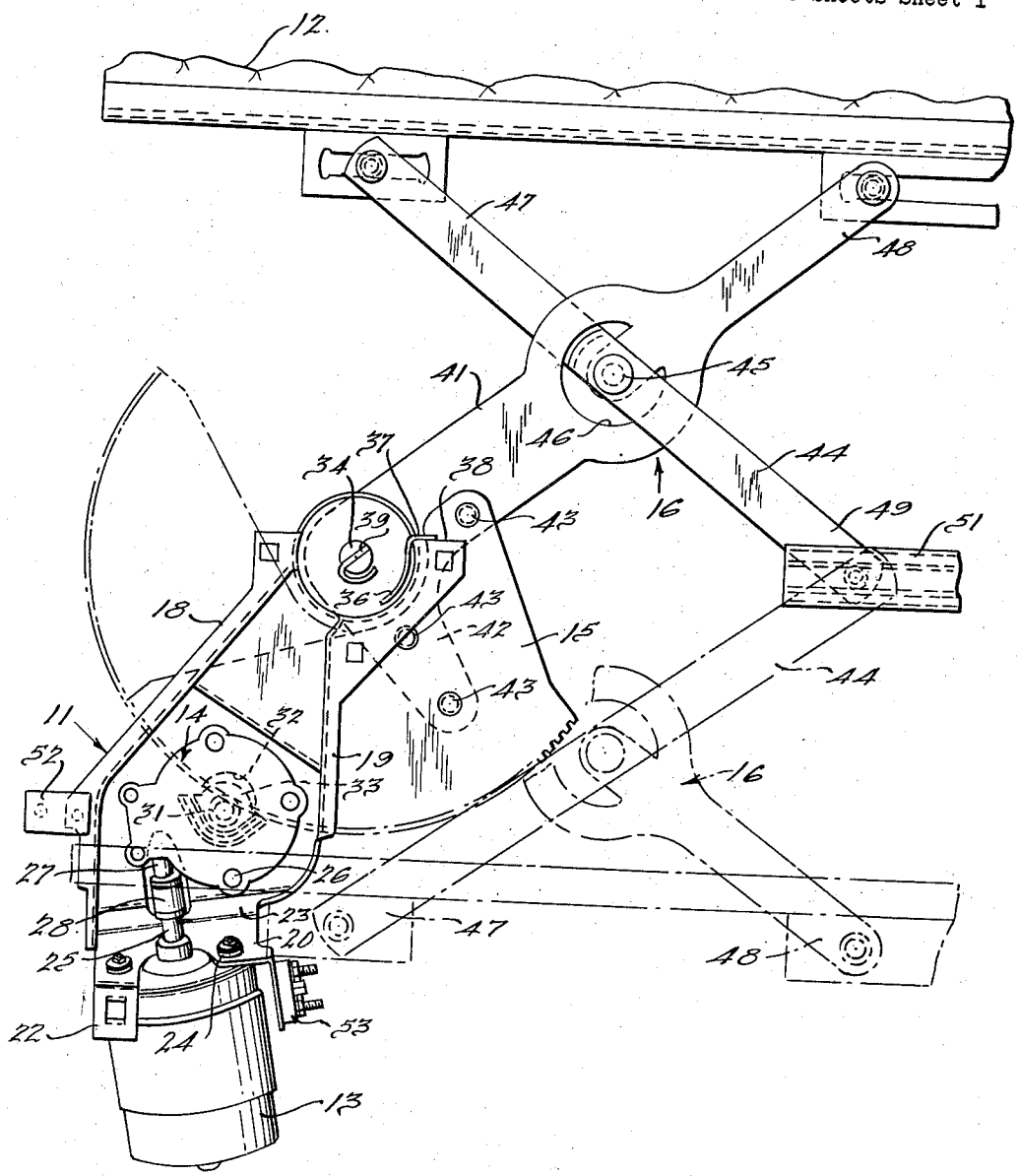
Figure 1 is an elevational view of the window regulator package unit of my invention together with a portion of the window, the mechanism being shown in its raised and lowered positions.

The window regulator mechanism shown in Figs. 1 to 3 comprises in general a unitary mounting plate 11 upon which are mounted the various elements which comprise a complete assembly for vertically regulating a window 12 of an automotive vehicle or the like. These elements may be in themselves conventional parts of known power driven window regulator systems, and comprise in general a rotary power source such as a reversible electric motor 13, a power transmission unit 14 connected to the motor, a gear or gear sector 15 driven by the unit 14, and a window actuating linkage 16 of a scissors or cross-arm type well known in the art. The mounting plate 11 is of generally elongated shape and flat configuration, and is adapted to be secured to a panel 17 within the door body, as shown in Fig. 2. It will be understood that while it is preferred that the mounting plate be fabricated as shown of a single metal blank, the unitary construction could as well be achieved by building up two or more metal sections which are joined by welding or similar means. The plate comprises a pair of raised attaching flanges 18 and 19 along the side edges, these flanges being in substantially parallel relation with the main portion of the plate. A motor mounting flange 20 is provided at the lower end of the mounting plate, and this flange extends transversely to the plane of the mounting plate and has motor mounting holes 21 and a lip 22 for attachment to door panel 17. A bent-back inclined section 23 having a portion of relatively sharp curvature connects flange 20 to the body of the mounting plate. Motor 13 is preferably secured at its upper end to flange 20 by rubber mounting means 24 to prevent vibration, and the shaft 25 of the motor extends in angular relation to the plane of the mounting plate, thus allowing motor 13 to be suspended from the plate and reside within the door body without interfering with the door panels.

Power transmission unit 14 comprises an input shaft, an output pinion, an enclosed reduction gearing connecting the two, and is preferably of a conventional type known in the art. Unit 14 is secured to the body of the mounting plate 11 at a flat portion above flange 20 by means of bolts 26. The input shaft 27 of the power transmission unit is disposed above shaft 25 of the motor and a resilient coupling 28 connects the two shafts, a clearance depression 29 in the mounting plate being disposed adjacent coupling 28. The output pinion 31 of the unit 14 extends through an opening 32 in the mounting plate. A guard 33 which may be formed by partially severing the mounting plate is disposed outwardly of pinion 31 and parallel to the plate, the guard serving to hold gear sector 15 in operative engagement with the pinion as shown in Fig. 1. The upper portion of the mounting plate is in the plane of and inclined with respect to the lower portion, and one arm 41 of the cross-arm actuating linkage 16 is pivotally mounted at the upper end of the mounting plate by means of a pivot stud 34 passing through an aperture 35 in the plate. The upper portion of the mounting plate forms a flat circular depression within which is disposed a counterbalance spring 36, one end 37 of this spring being engaged with edge 38 of the mounting plate and the opposite end 39 secured to pivot stud 34. Gear sector 15 is secured to arm 41 by means of an extension 42 on the arm and rivets or other fasteners 43. The other arm 44 of linkage 16 is pivoted at its midpoint to the midpoint of arm 41 by means of a pin 45, and arm 44 extends through a crescent slot 46 in arm 41 in the conventional manner. End 47 of arm 44 and end 48 of arm 41 are slidably connected to window 12, and end 49 of arm 44 is slidably mounted to track 51.

It will be apparent from the above description that upon actuation of motor 13 in either direction from a power source (not shown), the gear sector 15 will be caused to rotate, thus swinging arm 41 and vertically moving window 12 by means of actuating linkage 16. It will be noted that the entire unit may be preassembled outside of the door body and pretested using either an actual window or a simulated load. A thermostatic switch 52 which is connected in the motor power circuit (not shown) is also preferably secured on mounting plate 11, and likewise secured on the mounting plate is a junction block 53. The package unit may thus comprise all the necessary elements for the regulation of window 12.

Figures 4, 5:
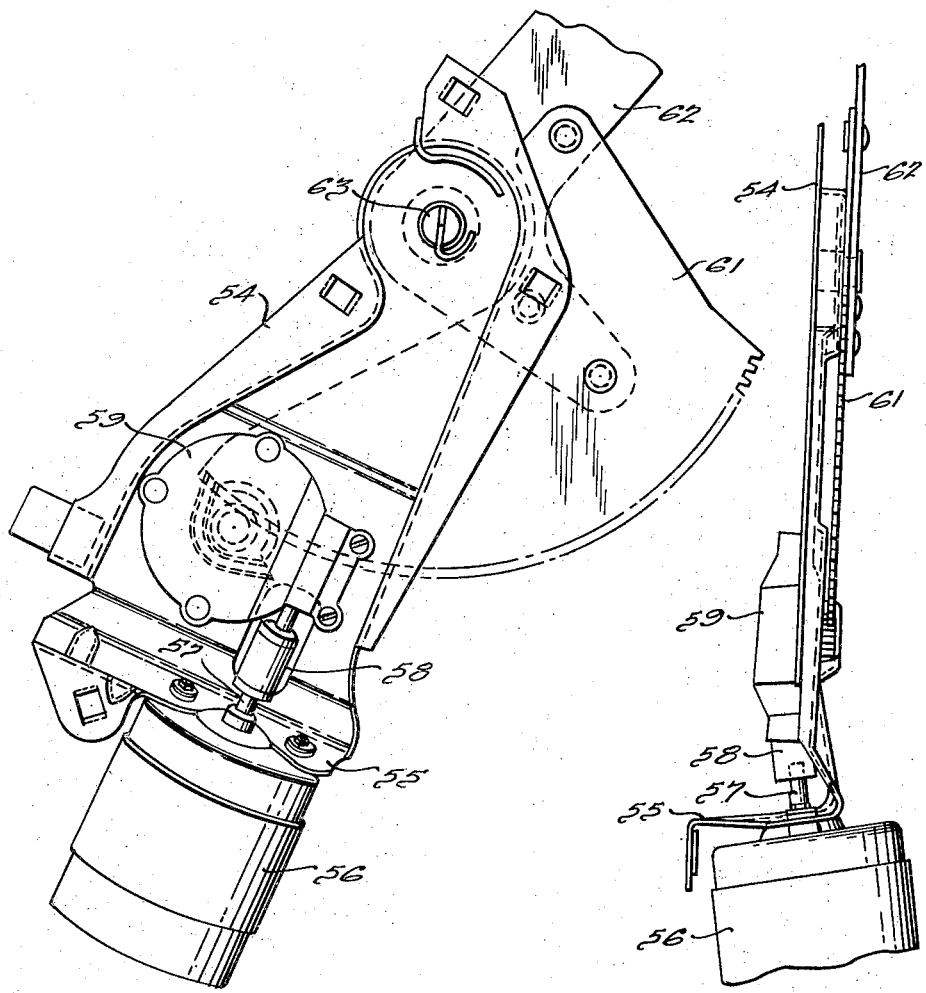
Figure 4 is an elevational view of a modification of the window regulator package unit, showing an alternate arrangement of the parts, portions of the actuating linkage being omitted.
Figure 5 is a side elevational view of the modification of Fig. 4.

Figs. 4 and 5 illustrate another embodiment of the window regulator package unit which is essentially similar to the embodiment of Figs. 1 to 3 but wherein the mounting plate 54 is of different shape than that of the mounting plate in the previous modification. In particular, the upper portion of plate 54 is aligned with the lower portion, the plate being supported in inclined position when installed. Motor mounting flange 55 extends substantially transversely to the longitudinal extent of the mounting plate, and the reversible electric motor 56 which is secured to flange 55 and is suspended therebelow has its shaft 57 extending substantially parallel with the longitudinal extent of the mounting plate and is connected by resilient connection 58 to power transmission unit 59. The unit 59 is secured to the mounting plate above flange 55 and drives gear sector 61 which is secured to arm 62 of the cross-arm type window actuated linkage (not shown). The arm 62 is pivotally secured to the mounting plate by pivot stud 63, the location of the pivot stud being substantially aligned with the motor shaft 57. The entire package unit thus forms an elongated assembly capable of installation in a door body having limited lateral interior space.

Figs. 6 and 7 illustrate a second modification similar in basic design to that of the embodiment of Figs. 1 to 3 and having a mounting plate 64 of generally angular shape. The two side edges 65 and 66 of the mounting plate are necked inwardly in the intermediate section between power transmission unit 67 and pivot stud 68. The upper edge 69 of the plate is inclined upwardly from its juncture with side edge 65 and the resultant shape of the mounting plate is especially adapted for installation in door body spaces having relatively larger vertical interior space accommodations.

Figures 8 and 9 illustrate a third modification of the improved window regulator which is similar in its basic principles to the previous embodiments but which is especially adapted for installations having relatively wide windows, such as may appear in limousines and vehicles of a similar type. In this modification, the mounting plate 71 is of generally angular shape and comprises a lower portion 72 supporting the motor 73 and an upper portion 74 integral with and extending transversely to the lower portion. The width of upper portion 74 is such that the cross-arm 75 of the cross-arm linkage is pivotally mounted a substantial lateral distance from the power transmission unit 76. The latter is secured to the upper portion 74 substantially above motor 73, and flexible shaft 77 extends across the side edge 78 of the mounting plate, connecting the motor and transmission unit. Gear sector 79 is pivotally secured to the mounting plate by pin 81 and is operatively meshed with the output pinion 82 of the transmission unit. The inner end of arm 75 is likewise mounted on pin 81, and in this embodiment a tie plate 83 connects the arm 75 to the gear sector for movement therewith. The mounting plate is secured to the door panel by means of raised attaching flanges 84 and 85. Longitudinal strengthening ribs 86 may be provided along the lower portion 72 of the mounting plate to increase the structural rigidity of the unit.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

I claim:

1. A mechanism for regulating a vehicle window or the like, comprising a unitary mounting plate of generally flat elongated configuration, the lower portion of said mounting plate being inclined in one direction with respect to the plane of the plate, a flange extending transversely in the other direction from the lower portion of said plate, a rotary driving motor secured in suspended relation on one side of said flange, the shaft of said motor extending on the other side of said flange and being angularly disposed to the plane of said mounting plate, an enclosed power transmission unit secured to one side of said plate and having all portions thereof positioned above said motor, a flexible shaft operatively connecting said shaft and said unit on said one side, an arm pivoted to the upper end of said plate, a gear sector on the opposite side of said plate secured to said arm and operatively connected to said power transmission unit, a second arm pivoted to said first arm at an intermediate point thereof, and means for connecting said arms to a vehicle window or the like for raising and lowering the same.

2. The combination according to claim 1, the shaft of said motor being in substantial alignment with the longitudinal extent of said mounting plate and with the pivotal support for said first arm.

3. In a window regulator for automotive vehicles or the like, a unitary mounting plate of generally flat configuration, a flange extending laterally from said mounting plate at the lower end thereof, a motor attached at one end to said flange and suspended therefrom, said motor being laterally displaced from the plane of said mounting plate, a power transmission unit secured to one side of said mounting plate and having an output pinion on the other side of the plate, all portions of said unit being positioned above said motor, a flexible coupling connecting said motor and said unit on said one side, a gear sector pivotally mounted on said other side of said mounting plate and operatively meshing with the output pinion of said power transmission unit, and an arm secured to said gear sector and extending from said mounting plate, said arm being adapted to be connected to the window, whereby angular movement of said gear sector will impart motion to said window.

4. The combination according to claim 3, said mounting plate being of elongated configuration, said gear sector being mounted at the upper portion of said plate.

5. The combination according to claim 3, said mounting plate being of elongated configuration, said arm extending from the upper portion of said plate, and a second arm pivoted to an intermediate portion of said first arm, said second arm having one end adapted to be connected to the window and the opposite end adapted to move in a stationary guide.

6. The combination according to claim 3, said mounting plate having an upper portion of generally rectangular shape and a lower portion extending angularly downwardly from said upper portion, said power transmission unit and said gear sector being mounted on said upper portion of the mounting plate.

7. The combination according to claim 3, said mounting plate having an elongated lower portion and an upper portion of generally rectangular shape extending transversely to the lower portion, said power transmission unit being secured to said upper portion of the mounting plate.

References Cited in the file of this patent

UNITED STATES PATENTS

| Number | Name | Date |
|---|---|---|
| 2,222,659 | Gouin | Nov. 26, 1940 |
| 2,317,490 | Simpson | Apr. 27, 1943 |
| 2,324,145 | Floraday | July 13, 1943 |
| 2,331,260 | Wiseman | Oct. 5, 1943 |

FOREIGN PATENTS

| Number | Country | Date |
|---|---|---|
| 544,458 | Great Britain | Apr. 14, 1942 |